US008374608B2

(12) United States Patent
Ebata (10) Patent No.: US 8,374,608 B2
(45) Date of Patent: Feb. 12, 2013

(54) METHOD FOR ESTIMATING RECEPTION QUALITY OF COMMUNICATION AREA, APPARATUS THEREOF, AND PROGRAM THEREOF

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 749 days.

(21) Appl. No.: 12/060,640

(22) Filed: Apr. 1, 2008

(65) Prior Publication Data

US 2008/0247362 A1 Oct. 9, 2008

(30) Foreign Application Priority Data

Apr. 4, 2007 (JP) ................................. 2007-097912

(51) Int. Cl.
*H04W 36/00* (2009.01)
(52) U.S. Cl. ........ 455/436; 455/439; 455/442; 455/437; 455/438
(58) Field of Classification Search .................. 455/436, 455/439, 442, 437, 438
See application file for complete search history.

(56) References Cited

U.S. PATENT DOCUMENTS

| | | | | |
|---|---|---|---|---|
| 6,304,754 | B1 * | 10/2001 | DeSantis et al. | 455/436 |
| 6,615,044 | B2 * | 9/2003 | Tigerstedt et al. | 455/437 |
| 6,980,803 | B2 * | 12/2005 | Johansson | 455/438 |
| 2007/0142051 | A1 * | 6/2007 | Xu et al. | 455/436 |

FOREIGN PATENT DOCUMENTS

| | | |
|---|---|---|
| JP | 10-256981 | 9/1998 |
| JP | 2002-515712 | 5/2002 |
| JP | 2006-352385 | 12/2006 |

OTHER PUBLICATIONS

English-language abstract only of International Publication No. WO 99/59363 dated Nov. 18, 1999.

* cited by examiner

*Primary Examiner* — Nimesh Patel
(74) *Attorney, Agent, or Firm* — Scully, Scott, Murphy & Presser, P.C.

(57) ABSTRACT

A reception quality estimating method estimates reception quality of a wireless communication area for estimating success or failure of handover processing occurring in a service area of a wireless communication system including a plurality of base stations. The method includes a first step and a second step. In the first step, the reception qualities of radio waves from the plurality of base stations are grasped at a given location within the service area. In the second step, the start point and end point of the handover processing are estimated by referring to time required for the handover processing, moving speed of a mobile terminal, which are previously input, and the reception qualities, and then success or failure of the handover processing is estimated by referring to the reception qualities of radio waves from the base stations at the start point and end point of the handover processing.

19 Claims, 4 Drawing Sheets

FIG.3

301: BASE STATION
302: BASE STATION
303: WALL

FIG.4

| OBSERVATION POINT GRID NUMBER | RECEPTION POWER [dBm] | |
|---|---|---|
| | BASE STATION 301 | BASE STATION 302 |
| 1 | −40 | − |
| 2 | −38 | − |
| ⋮ | ⋮ | ⋮ |
| 23 | −60 | −68 |
| ⋮ | ⋮ | ⋮ |
| 34 | −59 | −68 |
| 35 | −61 | −66 |
| 36 | −65 | −67 |
| ⋮ | ⋮ | ⋮ |
| 47 | −92 | −64 |
| 48 | −78 | −64 |
| ⋮ | ⋮ | ⋮ |

FIG.5

- 304: DESK
- 305: SHELF
- 501: HO SUCCESS AREA
- 502: HO FAILURE AREA

FIG.6

- 304
- 305
- 601: HO SUCCESS AREA
- 602: HO FAILURE AREA

METHOD FOR ESTIMATING RECEPTION QUALITY OF COMMUNICATION AREA, APPARATUS THEREOF, AND PROGRAM THEREOF

BACKGROUND OF THE INVENTION

1. Field of the Invention

The present invention relates to a method for estimating reception quality of communication area, apparatus thereof, and program thereof and, more particularly, to a reception quality estimating method for estimating success or failure of handover within a communication area in a mobile communication system.

2. Description of the Related Art

Handover (hereinafter, referred to as "HO" for simplicity) exerts great influence on communication quality in a wireless communication system where mobile users are moving from one place to another. Thus, in designing and operating the wireless communication system, it is preferable to estimate the area (hereinafter, referred to as "HO area") where HO occurs and to estimate whether the HO fails (hereinafter, the area where HO fails is referred to as "HO failure area") or succeeds (hereinafter, the area where HO succeeds is referred to as "HO success area") so as to grasp the HO failure area and HO success area.

If the HO failure area and HO success area can clearly be distinguished from each other, parameter tuning capable of reducing the number of occurrences of faults due to the HO failure can be achieved in designing the wireless communication system. This avoids a trouble that an occurrence of a fault due to the HO failure becomes clear only after the actual operation of the system is started, thereby enabling stable operation.

As a related art of this technical area, there is known an HO area estimating method disclosed in Patent Document 1 (JP-2006-352385-A). This document discloses a method for grasping reception qualities of radio waves from a plurality of base stations at given locations within the service area of a wireless communication system and estimating the HO area based on the reception qualities. To implement this method, a condition for estimating the HO area and condition for estimating an area where a base station which is HO destination is not found and thereby communication becomes unstable are set in this technique.

With this technique, by previously grasping radio propagation characteristics (reception power distribution) of an area for which an occurrence of the HO needs to be confirmed based on a computer simulation or actual measurement, it is possible to estimate the HO area and area where communication becomes unstable.

Processing of HO includes searching an HO destination base station and assignment processing to the found HO destination base station, so that a predetermined time is required to complete the HO processing. Further, a mobile terminal may be moving under such a condition that the HO processing is carried out, so that reception quality always changes. Therefore, the reception quality changes even while the HO processing to switch to a new HO destination base station is carried out with the result that if a radio wave from an HO source base station cannot be received during the HO processing, communication breaks up. This is one of the factors of HO failure.

Further, there may be case where the reception quality of a radio wave from the HO destination base station at the time point when the HO destination base station is determined differs from that during execution of the HO processing or immediately after the execution of the HO processing even in a state where a radio wave from the HO source base station can be received. When the reception quality of a radio wave from the HO destination base station determined at the search time is deteriorated during or immediately after the HO processing, communication may break up, resulting in HO failure.

The technique disclosed in Patent Document 1 does not consider the time required for such HO processing, and the area where the HO occurs is estimated by referring only to the reception quality in the estimated area. More specifically, whether the HO occurs or not is determined based on whether the reception quality of a radio wave from the HO source base station is deteriorated and whether a difference in the reception quality between radio waves from the HO source base station and HO destination base station exceeds a specified value and, here, success or failure of the HO cannot be determined. Further, also as to an area where communication becomes unstable, the technique derives the area by referring only to the reception quality without considering the HO processing time.

The problem of the related art is that it is impossible to estimate success or failure of the HO processing when the HO occurs. This is because that the related art does not consider the time required for the HO processing and, accordingly, does not consider a change with time of the reception quality of a radio wave from the HO source base station and reception quality of a radio wave from the HO destination base station at the HO processing execution time.

SUMMARY OF THE INVENTION

The present invention has been made in view of the above problem, and an exemplary object thereof is to provide a method for estimating reception quality of communication area, apparatus thereof, and program thereof capable of estimating success or failure of the HO processing executed within an area where the HO occurs in a wireless communication system where mobile users are moving from one place to another.

According to an exemplary aspect of the present invention, there is provided a method for estimating reception quality of a wireless communication area for estimating success or failure of handover processing occurring in a service area of a wireless communication system including a plurality of base stations. The method includes a first step of grasping the reception qualities of radio waves from the plurality of base stations at a given location within the service area; and a second step of estimating the start point and end point of the handover processing by referring to time required for the handover processing, moving speed of a mobile terminal, which are previously input, and the reception qualities, and of estimating success or failure of the handover processing by referring to the reception qualities of radio waves from the base stations at the start point and end point of the handover processing.

According to an exemplary aspect of the present invention there is provided a reception quality estimating apparatus for estimating reception quality of a wireless communication area for estimating success or failure of handover processing occurring in a service area of a wireless communication system including a plurality of base stations. The apparatus includes: a propagation characteristics processing section for grasping the reception qualities of radio waves from the plurality of base stations at a given location within the service area; and a handover processing success/failure determination processing section for estimating the start point and end point of the handover processing by referring to time required for the handover processing, moving speed of a mobile terminal, which are previously input, and the reception qualities, and for estimating success or failure of the handover processing by referring to the reception qualities of radio waves from the base stations at the start point and end point of the handover processing.

According to an exemplary aspect of the present invention, there is provided a program, encoded in a computer-readable medium, for enabling a computer to execute operation of a reception quality estimating apparatus for estimating reception quality of a wireless communication area for estimating success or failure of handover processing occurring in a service area of a wireless communication system including a plurality of base stations. The program includes: a first processing of grasping the reception qualities of radio waves from the plurality of base stations at a given location within the service area; and a second processing of estimating the start point and end point of the handover processing by referring to time required for the handover processing, moving speed of a mobile terminal, which are previously input, and the reception qualifies, and of estimating success or failure of the handover processing by referring to the reception qualities of radio waves from the base stations at the start point and end point of the handover processing.

DETAILED DESCRIPTION OF THE EXEMPLARY EMBODIMENTS

An exemplary embodiment of the present invention will be described below with reference to the accompanying drawings.

Figure 1:
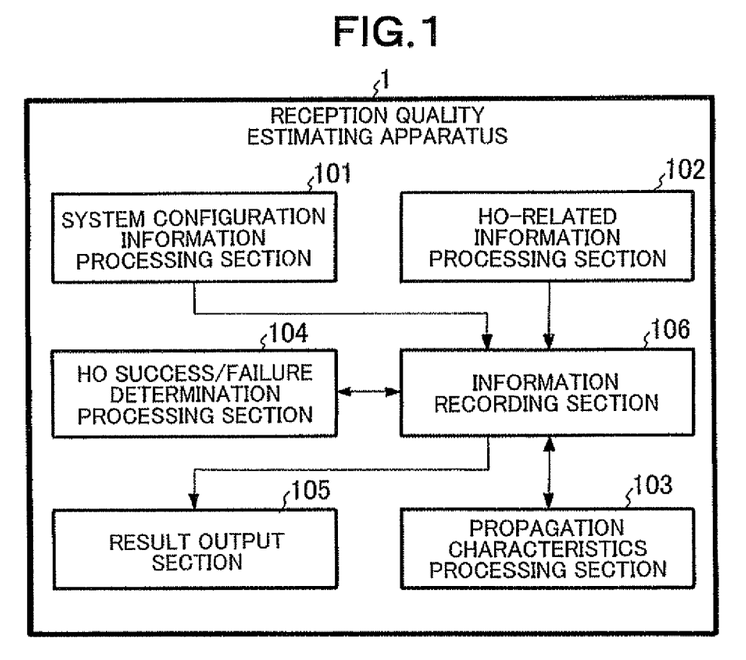
FIG. 1 is a schematic function block diagram of a quality estimating apparatus according to an exemplary embodiment of the present invention.

FIG. 1 is schematic function block diagram of a reception quality estimating apparatus according to an exemplary embodiment of the present invention. Referring to FIG. 1, a reception quality estimating apparatus 1 of the present invention includes a system configuration information processing section 101, an HO-related information processing section 102, a propagation characteristics processing section 103, an HO success/failure determination processing section 104, a result output section 105, and an information recording section 106.

The system configuration information processing section 101 inputs information related to a building situated in an estimation target wireless communication area, structures provided in the building, a wireless communication system used in the communication area, and the like. The HO-related information processing section 102 inputs information related to an execution of HO processing, such as time required for the HO processing and moving speed of a mobile user and determines the range resolution (interval) at which propagation characteristics required for determination of success or failure of the HO are grasped.

The propagation characteristics processing section 103 refers to the information supplied from the system configuration information processing section 101 and HO-related information processing section 102 to acquire the propagation characteristics so as to grasp reception quality. The HO success/failure determination processing section 104 refers to the reception quality gasped by the propagation characteristics processing section 103 and stored in the information recording section 106 to estimate the location of occurrence of the HO processing and success or failure thereof and records the estimation result.

The result output section 105 outputs the success or failure of the HO processing estimated by the HO success/failure determination processing section 104 using a display or the like. The information recording section 106 records the information inputted, collected, and calculated in the system configuration information processing section 101, HO-related information processing section 102, propagation characteristics processing section 103, and HO success/failure determination processing section 104.

Figure 2:
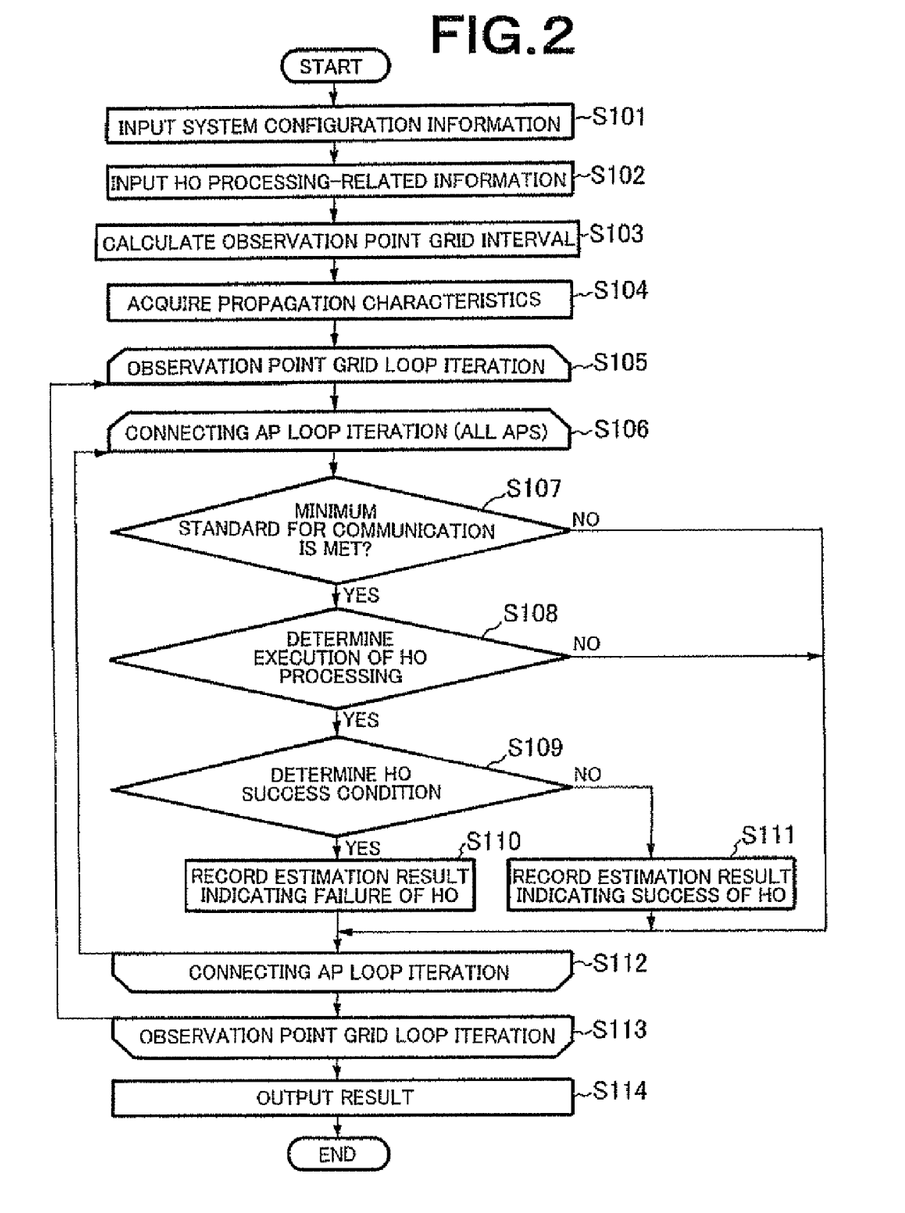
FIG. 2 is a flowchart showing operation of the exemplary embodiment of the present invention.

FIG. 2 is a flowchart showing operation of the exemplary embodiment of the present invention. With reference to FIGS. 1 and 2, operation of the exemplary embodiment of the present invention will be described below. In step S101, an operator of the reception quality estimating apparatus 1 of the present invention uses the system configuration information processing section 101 to input information related to a building and wireless communication system in an estimation target wireless communication area, and the input information is recorded in the information recording section 106. Concrete example of the information input and recoded include a map of the estimation target area, drawing of the layout of each floor of the building, information related to structures such as walls, columns, and furniture and fixtures, installation location of a base station (access point), transmission power, and antenna directivity.

In step S102, the operator uses the HO-related information processing section 102 to input information related to the HO processing, which is then recorded to the information recording section 106. Concrete examples of the information related to the HO processing include time required for the HO processing and moving speed of a user of a mobile terminal.

In step S103, the HO-related information processing section 102 uses the information recorded in step S102 to determine the range resolution of propagation characteristics required for estimating success or failure of the HO, that is, interval of locations at which the reception qualities of radio waves from base stations are grasped. Since a change in the reception quality during the HO processing needs to be grasped in order to estimate success or failure of the HO, so that it is necessary to grasp the reception quality at a distance interval less than the distance at which the user moves within a time period required for the HO processing. Therefore, the distance interval at which the reception quality is grasped can be calculated by user's moving speed×time required for HO processing. The calculated distance interval is recorded in the information recording section 106.

In step S104, the propagation characteristics processing section 103 uses the information stored in the information recording section 106 to grasp propagation characteristics. Here, the estimation target area is divided into small sections and each small section is defined as an observation point grid.

In this case, the grasped propagation characteristics data represents the reception quality of each base station at each observation point grid. The interval between the small sections is set to a value not more than the distance interval calculated in step S103.

As a concrete method of grasping the propagation characteristics, a method in which a simulation is performed by using a known technique such as a ray tracing or statistical estimating method and a method in which a radio wave is transmitted from a base station actually installed and received/measured using a measuring instrument may be adopted.

In step S105 and subsequent steps, the HO success/failure determination processing section 104 performs estimation of success or failure of the HO. Step S105 is the end of a loop iteration in which estimation is made for each observation point grid. Hereinafter, an observation point grid being estimated is referred to as "estimation target observation point grid". Step 106 is the end of a loop iteration in which estimation is made for each connecting base station. Note that the base station is abbreviated as AP (Access Point) in FIG. 2.

Hereinafter, a connecting base station being estimated is referred to as "estimation target connecting base station". The estimation is made at each observation point grid with all the base stations regarded respectively as the connecting base station. This is because that, in actual HO, the connecting base station may differ at the same location as a result of estimation of the movement of a user of a mobile terminal.

In step S107, it is determined whether a terminal assumed to exist at an estimation target observation point grid can be connected to an estimation target connecting base station. When the reception quality of a radio wave from a given estimation target connecting base station at the estimation target observation point grid does not meet a minimum standard for communication, the estimation target connecting base station cannot be the connecting base station. When "No" is determined in step S107, the HO cannot occur and, accordingly, the flow advances to step S112. When "Yes" is determined in step S107, there is a possibility of an occurrence of the HO and, accordingly, the flow advances to step S108.

In step S108, it is determined whether the HO processing is executed starting from the estimation target observation point grid. Since the HO processing is processing for switching from a given connecting base station to another when the reception quality of a radio wave from the given connecting base station is deteriorated, it is determined, when it is assumed that the user moves from the estimation target observation point grid to an adjacent observation point grid, whether the HO can occur while the user is moving.

In determining the occurrence of the HO, with respect to the estimation target connecting base station, first a base station (hereinafter, referred to as "HO destination base station") regarded as a candidate for the HO destination is extracted. The requirements of the base station extracted as the HO destination base station are that: it is extracted from base stations other than the estimation target connecting base station; it achieves the highest reception quality among the base stations existing at the estimation target observation point grid; and the reception quality of a radio wave from the base station to be extracted meets a minimum standard for communication. When the reception quality of a radio wave from the extracted HO destination base station does not meet the minimum standard, the HO processing cannot be extracted starting from the corresponding estimation target observation point grid and, accordingly, the flow advances to step S112.

When the reception quality of a radio wave from the extracted HO destination base station meets the minimum standard, it is determined whether the HO processing is executed starting from the corresponding estimation target observation point grid by referring to the reception quality of a radio wave from the estimation target connecting base station and that of a radio wave from the HO destination base station. More specifically, first the time required for the HO processing and user's moving speed are referred to and are multiplied by each other to derive a distance (hereinafter, referred to as "moving distance during HO") over which the user moves during the HO processing. Then, an observation point grid located at a position away from the estimation target observation point grid by the derived moving distance during HO is extracted as a candidate of an HO processing end point.

A plurality of candidates of the HO processing end point may exist. After the candidates of the HO processing point have been estimated, it is determined whether the HO processing is executed by referring to the reception qualities of radio waves from the connecting base stations and HO destination base stations at the estimation target observation point grid which is set as the HO processing start point and the candidates of the HO processing end points.

The determination of the execution of the HO processing may be made using a known method such as the abovementioned estimating method of HO disclosed in Patent Document 1. Alternatively, when a setting is made in a mobile terminal such that the HO processing is started at the time point when the reception power of a radio wave from the connecting base station is decreased to a specific value, e.g., −75 dBm, it can be determined that in the case where the reception power of a radio wave from the connecting base station at the HO processing start point exceeds −75 dBm and where the reception power of a radio wave from the connecting base station at the HO processing end point becomes equal to or less than −75 dBm, the HO processing between the two points is executed.

In the case where it is determined that the HO processing is executed, the candidate of the HO processing end point is determined to be the HO processing end point. There may be a case where a plurality of the HO processing end points exist. In the case where it is determined that the HO processing is executed starting from the current estimation target observation point grid as described above, the flow advances to step S109. On the other hand, in the case where it is determined that the HO processing is not executed, the flow advances to step S112.

In step S109, success or failure of the HO processing starting from the estimation target observation point grid and leading to the HO processing end point estimated in step S108 is determined. When any one of the following conditions is satisfied, it is determined that the HO processing fails, and the flow advances to step S110. When both of the conditions are not satisfied, it is determined that the HO processing succeeds, and flow advances to step S111. As specified values related to the reception quality, the reception quality of the HO source base station required for execution of the HO processing is defined as Q1, and reception quality of the HO destination base station required for execution of the HO processing is defined as Q2.

Condition 1: Reception quality of estimation target connecting base station at observation point grid (hereinafter, referred to as "HO processing end point grid") estimated as HO processing end point is less than Q1.

Condition 2: Reception quality of HO destination base station at HO processing end point grid estimated as HO processing end point is less than Q2.

By referring to the reception qualities of radio waves from the estimation target connecting base station and HO destination base station at the HO processing end point grid as described above, a change in the reception quality occurring from the start to end of the HO processing can be grasped, thereby allowing estimation of success or failure of the HO processing executed starting from the estimation target observation point grid.

When it is determined that the HO processing fails in step S109, the flow advances to step S110 where information indicating that although an HO is executed between the current estimation target observation point grid and HO processing end point grid, the HO may fail is recorded. On the other hand, when it is determined that the HO processing succeeds in step S109, the flow advances to step S111 where information indicating that an HO is executed between the current estimation target observation point grid and HO processing end point grid and the HO may succeed is recorded.

Step S112 is the loop iteration end at which the estimation of success or failure of the HO executed when the mobile terminal is connected to a specified estimation target connecting base station at a specified estimation target observation point grid is completed. Here, the flow returns to step S106 where another base station is selected as the estimation target connecting base station and, then, the processing of step S107 and subsequent steps are executed. The above series of processing is repeated until all the base stations are selected as the estimation target connecting base station.

Step S113 is the loop iteration end at which the estimation made when the respective base stations are regarded as the connection base station at one estimation target observation point grid is completed. Here, the flow returns to step S105 where another observation point grid is selected and, then, the processing of step S106 and subsequent steps are executed. The above series of processing is repeated until all the observation point grids are selected as the estimation target observation point grid.

With the above operation flow, it is estimated whether the HO is executed when all the base stations are regarded as the connecting base station at all the observation point grids as well as success or failure thereof. The HO success/failure determination processing section 104 sends the estimation result to the result output section 105.

In step S114, the result output section 105 outputs the estimation result of success or failure of the HO in a user-recognizable manner. In the case where, e.g., a display unit is used to output the estimation result, the reception quality at one estimation area is made different from that at another estimation area by using a color or specific pattern in accordance with the estimation result indicating success or failure of the HO. By representing the reception qualities using a color or pattern as described above, a viewer can easily grasp the estimation result over the entire estimation target area.

Concretely, by displaying only colored HO success areas or colored HO failure areas in a superimposed manner on the structure information such as a map of the estimation target area or drawing of the layout of each floor of the building, the viewer easily grasp the actual positional relationship between structures and HO success or failure areas. With the method as described above, the estimation result can easily be used in designing and operating the wireless communication system.

EXAMPLE

Figure 3:
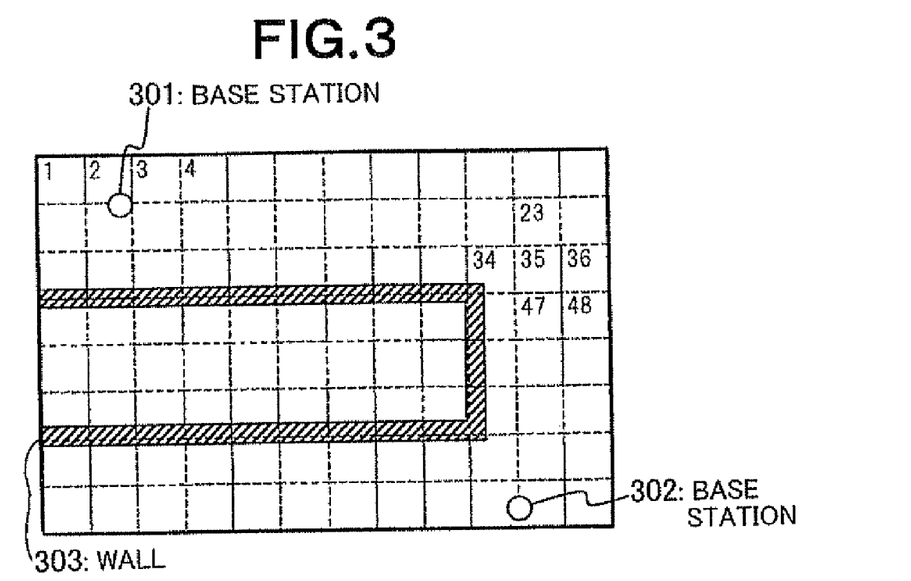
FIG. 3 is a pattern diagram for explaining an example of the present invention.

In the following, an example will be described for further understanding of the present exemplary embodiment. FIG. 3 is a pattern diagram for explaining an example of the present invention. In FIG. 3, a given floor (estimation target area) of a building is divided in a matrix pattern to obtain a plurality of observation point grids. Identification numbers (1, 2, 3, . . . , 47, 48, . . . ) are sequentially assigned to the respective observation point grids from the upper left corner of the matrix pattern. The interval between the observation point grids is set to a value not more than the distance interval (calculated in step S103 of FIG. 2) at which the reception quality is grasped. As shown in FIG. 3, two base stations 301 and 302 are installed in the matrix.

In step S101 of FIG. 2, the building floor information of FIG. 3, information related to structures provided in the floor such as a wall 303, and information related to the base stations 301 and 302 are input and recorded. In step S102, the time required for the HO processing and user's moving speed (i.e., moving speed of a mobile terminal) are input as the information related to the HO processing. It is assumed, in the present example, that the time required for the HO processing is 0.3 sec, and user's moving speed is 1.4 m/s. As a result, the distance interval at which the reception quality is grasped can be calculated as follows:

$$0.3[s] \times 1.4[m/s] = 0.42[m]$$

The time required for the HO processing, user's moving speed, and calculated distance interval at which the reception quality is grasped are recorded in the information recording section 105 in this processing step.

Subsequently, in step S104, the propagation characteristics in the floor shown in FIG. 3 are grasped. The interval between the observation point grids in the present example needs to be set to not more than 0.42 in which is obtained in step S102. Thus, it is assumed that the interval between the observation point grids in FIG. 3 is set to 0.42 m. When the distance interval between the observation point grids is set a value equal to the moving distance during HO obtained in step S102, it can be said that the HO processing is completed while the mobile user (mobile terminal) moves by one grid.

Figure 4:
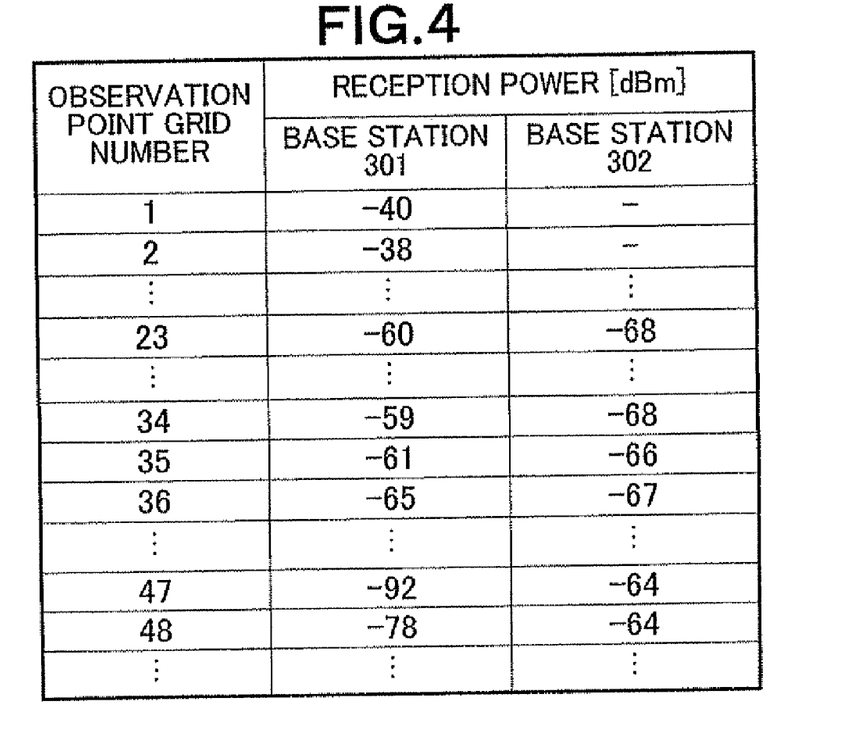
FIG. 4 is a table showing an example of reception power at each observation point grid of FIG. 3.

A reception power can be used as one representing the propagation characteristics at each observation point, and the propagation characteristics can be acquired using a known method such as a simulation or actual measurement. In the present example, as shown in FIG. 4, reception powers from the respective base stations at respective observation points are grasped. The notation for the reception power "−" in the table of FIG. 4 represents that a radio wave from the corresponding base station is affected by noise and cannot be received. The grasped propagation characteristics are recorded in the information recording section 105.

One observation point grid is picked up in step S105, and one base station is picked up by the connecting base station in step S106. In this example, an observation point grid 35 is assumed to be picked up as the estimation target observation point grid, and base station 301 is assumed to be picked up as the estimation target connecting base station. In step S107, it is determined whether the reception quality of a radio wave from the base station 301 at the observation point grid 35 as connecting base station meets a minimum standard for communication. It is assumed here that the minimum standard of the reception power for communication is −80 dBm. Since, as shown in table of FIG. 4, the reception power from the base station 301 at the observation point grid 35 is −61 dBm, which meets the minimum standard, it is determined that the base station 301 can be connected to a mobile terminal at the observation point grid 35.

In step S108, the HO destination base station is selected. As the HO destination base station, a base station achieving the highest reception quality among the base stations other than the estimation target connecting base station is selected. In this example, a base station other than the base station 301 includes only the base station 302, so that it is determined whether a radio wave from the base station 302 meets the minimum standard of the reception power. Since, as shown in table of FIG. 4, the reception power from the base station 302 at the observation point grid 35 is −66 dBm, which meets the minimum standard, the base station 302 is selected as the HO destination base station.

Since the base station 302 is selected as the HO destination base station as described above, it is determined whether an HO is executed starting from the observation point grid 35 which is the estimation target observation point grid by referring to the reception qualities of radio waves from the base stations 301 and 302. In making the above determination, it is necessary to derive observation point grids at which the HO processing is completed. However, in the present example, since the distance over which the mobile user moves within the time required for the HO processing is a value just corresponding to one observation point grid, grids placed adjacent to the observation point grid 35 are selected as the candidates of the HO processing end point. Concretely, observation point grids 23, 34, 36, and 47 are selected as the candidates of the HO processing end point, and it is then determined whether the HO processing is executed between the estimation target observation point grid and each of the above respective candidates of the HO processing end point.

Here, as a criterion for determining the execution of the HO, a condition that the reception power of a radio wave from the estimation target connecting base station is changed from a value exceeding −75 dBm to a value not more than −75 dBm is used. Referring to the reception power of a radio wave from the estimation target connecting base station (base station 301) at the estimation target observation point grid and reception power of the estimation target connecting base station (base station 301) at the respective candidates of the HO processing end point, the observation point grid 47 satisfies the above condition, and is therefore determined to be the HO processing end point. Other candidates of the HO processing end point do not satisfy the condition and are therefore not determined as the HO processing end point.

In step S109, success or failure of the HO processing executed between the observation point grids 35 and 47. The specified values Q1 and Q2 of the reception qualities used for the estimation in the present example are assumed to be −80 dBm. As the specified value, the minimum value of the reception quality at which a radio wave can be received or a value of the reception quality at which voice communication is performed in a good condition may be used.

It is estimated whether the abovementioned conditions 1 and 2 for determining success or failure of the HO processing are satisfied by referring to the reception qualities of radio waves from the estimation target connecting base station 301 and HO destination base station 302 at the observation point grids 35 and 47. Then, it can be seen that the condition 1 is satisfied since the reception quality of a radio wave from the estimation target connecting base station 301 at the observation point grid 47 which is the HO processing end point is −92 dBm. As a result, it is determined that the HO executed between the observation point grid 35 (start point) and observation point grid 47 (end point) fails.

In another case, namely, in the case where the observation point grid 36 is selected as the estimation target observation point grid, the observation point grid 48 is extracted as the HO processing end point. Here, it is estimated whether the conditions 1 and 2 are satisfied by referring to the reception qualities at the both observation point grids. Then, it can be seen that the conditions 1 and 2 are both not satisfied. In such a case, it is determined that the HO executed between the observation point grid 36 (start point) and observation point grid 48 (end point) succeeds.

In step S110, information indicating that the HO occurring between the estimation target observation point grid 35 and observation point grid 47 set as the HO processing end point may fail is recorded. The estimation of success or failure of the HO processing as described above is made with each base station set as the estimation target connecting base station and each observation point grid set as estimation target observation point grid. As a result, information indicating success or failure of the HO estimated to be executed in the estimation target floor is recorded in the information recording section 106 together with information of the observation point grids set as the HO start point and end point.

Figure 5:
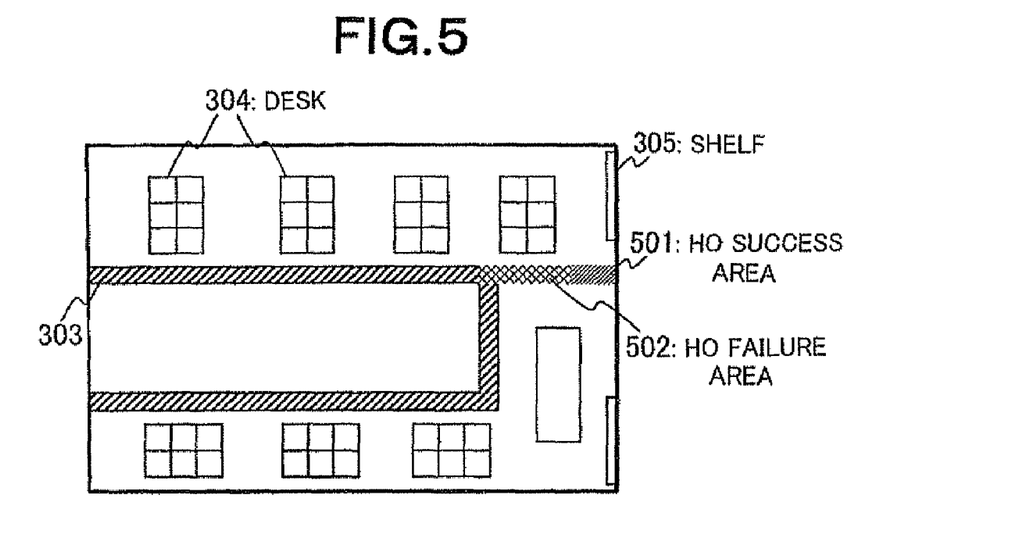
FIG. 5 is a display example of HO failure location and HO success location, which is output by the exemplary embodiment of the present invention.

FIG. 5 shows an example of an estimation result which is output, in step S115, based on the information indicating success or failure of the HO recorded in the information recording section 106. In FIG. 5, the area between the start point and end point of the HO which is estimated to fail is represented by diagonally cross shading, and area between the start point and end point of the HO which is estimated to succeed is represented by shading in a superimposed manner on the estimation target building floor. By displaying the estimation result in a superimposed manner on the map or drawing of the layout of each floor of the building in the manner as described above, it is possible to easily confirm the locations at which the HO occurs and at which the HO succeeds or fails.

Figure 6:
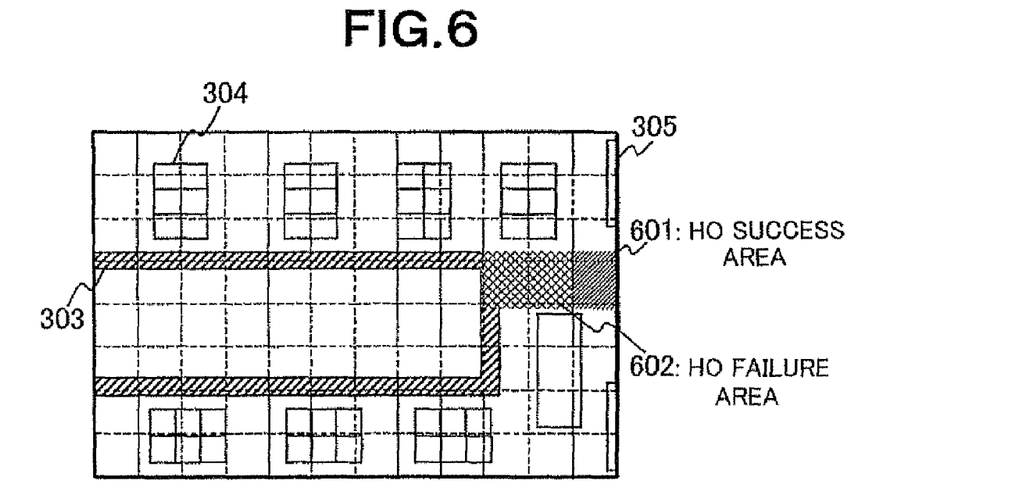
FIG. 6 is another display example of HO failure location and HO success location, which is output by the exemplary embodiment of the present invention.

In the present example, the interval between the observation point grids is made equal to the distance over which the mobile user moves within the time required for the HO processing time and, therefore, the HO start point and HO end point exist in the grids adjacent to each other. In the case where the interval between the observation point grids is set to a value smaller than the distance over which the mobile user moves within the time required for the HO processing time, the HO start point and HO end point may exist across a plurality of observation point grids in some cases. FIG. 6 shows an example of an estimation result output in such a case. As shown in FIG. 6, observation point grids existing between the observation point grids including the HO start point and HO end point are contained in the estimation result.

The operation flow of the present exemplary embodiment may previously be stored in a recording medium (computer-readable medium) such as an ROM (Read Only Memory), as a control program. In this case, a computer such as a CPU (Central Processing Unit) executes the control program corresponding to the operation flow by reading it from the recording medium. Although a reception power value is used as the reception quality in the above example, the index of the reception quality is not limited to this. For example, at least one of a combination of delay spread or error rate of reception data, SNR (Signal-to-Noise Ratio), SIR (Signal-to-Interference power Ratio) and propagation loss may be used.

The exemplary advantage according to the present invention will be described. The time required for the handover processing and moving speed of a user of a terminal in the estimation target system are grasped, an estimation target area is divided into small sections whose each size is smaller than the distance over which the mobile user moves within the time required for the handover processing time which is derived from the time required for the handover processing and user moving speed, the reception qualities of radio waves from a plurality of base stations installed in the small section estimated as the handover start point and in the small section estimated as the handover end point are grasped respectively, and whether a condition in which the handover fails is satisfied or not is determined. With the above operation, success or failure of the handover can be estimated.

According to the exemplary aspect of the present invention, by referring to the time required for the HO processing, moving speed of a user of a terminal in the estimation target system, and the reception qualities of radio waves from an HO source base station located at HO processing end point and HO destination base station, success or failure of the HO can be estimated.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2007-097912 filed on Apr. 4, 2007, the disclosure of which is incorporated herein in its entirety by reference.

What is claimed is:

1. A reception quality estimating method for estimating reception quality of a wireless communication area for estimating success or failure of handover processing occurring in a service area of a wireless communication system including a plurality of base stations, comprising:
    a first step of grasping reception qualities of radio waves from a plurality of base stations at a given location within a service area; and
    a second step of estimating a start point and an end point of a handover processing by referring to a time required for the handover processing, a moving speed of a mobile terminal, which are previously input, and the reception qualities, and of estimating success or failure of the handover processing by referring to the reception qualities of radio waves from the plurality of base stations at the end point of the handover processing,
    wherein the end point of the handover processing is located at a position away from the start point of the handover processing by a distance over which the mobile terminal moves during the handover processing, the distance being derived from multiplying the time required for the handover processing by the moving speed of the mobile terminal.

2. The reception quality estimating method according to claim 1, wherein the reception quality is determined based on at least one of reception power, delay spread, SNR (Signal-to-Noise Ratio), SIR (Signal-to-Interference power Ratio) and propagation loss.

3. The reception quality estimating method according to claim 1, wherein in the first step, an interval between the locations at which the reception qualities in the service area are grasped is set to a value not more than the distance over which the mobile terminal moves within handover processing time, the distance being derived from multiplying the time required for the handover processing time by the moving speed of the mobile terminal.

4. The reception quality estimating method according to claim 1, wherein the second step
    estimates the end point of the handover processing when a given location within the service area is set as the start point of the handover processing,
    estimates that the handover processing between the start point and the end point may fail in the case where the reception quality of a radio wave from a handover source base station at the end point is less than a specified quality value Q1 or where the reception quality of a radio wave from a handover destination base station at the end point is less than a specified quality value Q2, and
    estimates that the handover processing between the start point and the end point may succeed in the case where the reception quality of a radio wave from a handover source base station at the end point is not less than a specified quality value Q1 and the reception quality of a radio wave from a handover destination base station at the end point is not less than a specified quality value Q2.

5. The reception quality estimating method according to claim 4, wherein as the specified quality value Q1 or Q2, one of the minimum value of the reception quality at which a radio wave can be received or minimum value of the reception quality at which the quality of voice communication is not deteriorated is used.

6. The reception quality estimating method according to claim 1, further comprising a third step of representing the estimation result using a color or pattern and displaying it in a superimposed manner on information related to structures provided in the service area.

7. A reception quality estimating apparatus for estimating reception quality of a wireless communication area for estimating success or failure of handover processing occurring in a service area of a wireless communication system including a plurality of base stations, comprising:
    a propagation characteristics processing section for grasping reception qualities of radio waves from a plurality of base stations at a given location within a service area; and
    a handover processing success/failure determination processing section for estimating a start point and an end point of the handover processing by referring to a time required for the handover processing, a moving speed of a mobile terminal, which are previously input, and the reception qualities, and for estimating success or failure of the handover processing by referring to the reception qualities of radio waves from the base stations at the end point of the handover processing,
    wherein the end point of the handover processing is located at a position away from the start point of the handover processing by a distance over which the mobile terminal moves during the handover processing, the distance being derived from multiplying the time required for the handover processing by the moving speed of the mobile terminal.

8. The reception quality estimating apparatus according to claim 7, wherein the reception quality being based on at least one of reception power, delay spread, SNR (Signal-to-Noise Ratio), SIR (Signal-to-Interference power Ratio) and propagation loss.

9. The reception quality estimating apparatus according to claim 7, wherein as an interval between the locations at which the reception qualities in the service area are grasped, the propagation characteristics processing section sets to a value not more than the distance over which the mobile terminal moves within handover processing time, the distance being derived from multiplying the time required for the handover processing time by the moving speed of the mobile terminal.

10. The reception quality estimating apparatus according to claim 7, wherein the handover processing success/failure determination processing section
    estimates the end point of the handover processing when a given location within the service area is set as the start point of the handover processing, estimates that the handover processing between the start point and the end point may fail in the case where the reception quality of a radio wave from a handover source base station at the end point is less than a specified quality value Q1 or where the reception quality of a radio wave from a handover destination base station at the end point is less than a specified quality value Q2, and estimates that the handover processing between the start point and the end point may succeed in the case where the reception quality of a radio wave from a handover source base station at the end point is not less than a specified quality value Q1 and the reception quality of a radio wave from a handover destination base station at the end point is not less than a specified quality value Q2.

11. The reception quality estimating apparatus according to claim 10, wherein as the specified quality value Q1 or Q2, one of the minimum value of the reception quality at which a radio wave can be received or minimum value of the reception quality at which the quality of voice communication is not deteriorated is used.

12. The reception quality estimating apparatus according to claim 7, further comprising a result output section for representing the estimation result using a color or pattern and displaying it in a superimposed manner on information related to structures provided in the service area.

13. A non-transitory computer-readable medium having stored therein a program, for enabling a computer to execute operation of a reception quality estimating apparatus for estimating reception quality of a wireless communication area for estimating success or failure of handover processing occurring in a service area of a wireless communication system including a plurality of base stations, comprising:

a first processing of grasping reception qualities of radio waves from a plurality of base stations at a given location within a service area; and a second processing of estimating a start point and an end point of the handover processing by referring to a time required for the handover processing, a moving speed of a mobile terminal, which are previously input, and the reception qualities, and of estimating success or failure of the handover processing by referring to the reception qualities of radio waves from the base stations at the end point of the handover processing, wherein the end point of the handover processing is located at a position away from the start point of the handover processing by a distance over which the mobile terminal moves during the handover processing, the distance being derived from multiplying the time required for the handover processing by the moving speed of the mobile terminal.

14. The non-transitory computer readable medium according to claim 13, wherein the reception quality is determined based on at least one of reception power, delay spread, SNR (Signal-to-Noise Ratio), SIR (Signal-to-Interference power Ratio) and propagation loss.

15. The non-transitory computer readable medium according to claim 13, wherein in the first processing, an interval between the locations at which the reception qualities in the service area are grasped is set to a value not more than the distance over which the mobile terminal moves within handover processing time, the distance being derived from multiplying the time required for the handover processing time by the moving speed of the mobile terminal.

16. The non-transitory computer readable medium according to claim 13, wherein the second processing estimates the end point of the handover processing when a given location within the service area is set as the start point of the handover processing, estimates that the handover processing between the start point and the end point may fail in the case where the reception quality of a radio wave from a handover source base station at the end point is less than a specified quality value Q1 or where the reception quality of a radio wave from a handover destination base station at the end point is less than a specified quality value Q2, and estimates that the handover processing between the start point and the end point may succeed in the case where the reception quality of a radio wave from a handover source base station at the end point is not less than a specified quality value Q1 and the reception quality of a radio wave from a handover destination base station at the end point is not less than a specified quality value Q2.

17. The non-transitory computer readable medium according to claim 16, wherein as the specified quality value Q1 or Q2, one of the minimum value of the reception quality at which a radio wave can be received or minimum value of the reception quality at which the quality of voice communication is not deteriorated is used.

18. The non-transitory computer readable medium according to claim 13, further comprising a third processing of representing the estimation result using a color or pattern and displaying it in a superimposed manner on information related to structures provided in the service area.

19. A wireless communication system including a reception quality estimating apparatus according to claim 7.

* * * * *